United States Patent [19]
Gutman et al.

[11] Patent Number: 5,428,629
[45] Date of Patent: Jun. 27, 1995

[54] ERROR CHECK CODE RECOMPUTATION METHOD TIME INDEPENDENT OF MESSAGE LENGTH

[75] Inventors: Michael Gutman, Haifa, Israel; Ping Dong, North Quincy, Mass.

[73] Assignee: Motorola, Inc., Schaumburg, Ill.

[21] Appl. No.: 263,902

[22] Filed: Jun. 20, 1994

Related U.S. Application Data

[63] Continuation of Ser. No. 42,756, Apr. 6, 1993, abandoned, which is a continuation of Ser. No. 608,109, Nov. 1, 1990, abandoned.

[51] Int. Cl.$^6$ ............... G06F 11/08; H03M 13/00
[52] U.S. Cl. ..................... 371/37.1; 371/37.7; 371/37.8
[58] Field of Search ........ 371/37.1, 37.2, 37.3, 371/37.4, 37.5, 37.6, 37.7, 37.8

[56] References Cited

U.S. PATENT DOCUMENTS

| | | | |
|---|---|---|---|
| 3,678,469 | 7/1972 | Freeman et al. | 371/37.1 |
| 3,893,078 | 7/1975 | Finet | 371/37.1 |
| 4,320,511 | 3/1982 | Koga et al. | 371/37.1 |
| 4,475,192 | 10/1984 | Fernow et al. | 370/94 |
| 4,555,784 | 11/1985 | Wood | 371/37.1 |
| 4,866,654 | 9/1989 | Yamada | 371/37.1 |
| 5,003,539 | 3/1991 | Takemoto et al. | 371/37.1 |
| 5,134,618 | 7/1992 | Matt et al. | 371/37.6 |

OTHER PUBLICATIONS

D. R. Irvin, "Preserving the Integrity of Cyclic-Redundance Checks When Protected Text is Intentionally Altered," IBM J. RES. Develop., vol. 33, pp. 618–626 received by IEEE Dec. 16, 1988 and accepted for publication Nov. 21, 1989.

CCITT Study Group XVIII, Question 3-XVIII, Contribution 14, "CRC4–Recommendation Amendments for an Automatic Interworking & Message Channel Capability," 2/90.

F. J. MacWilliams, N. J. A. Sloane, "The Theory of Error-Correcting Codes," North Holland pp. 88–92.

Primary Examiner—Hoa T. Nguyen
Assistant Examiner—Trinh Tu
Attorney, Agent, or Firm—Darleen J. Stockley

[57] ABSTRACT

In a data packet communications network capable of transmitting a digitally coded data packet message including an error-check code from a source node to a destination node over a selected transmission link which includes at least one intermediate node operative to intentionally alter a portion of a message to form an altered message which is ultimately routed to the destination node, a method of recomputing at the intermediate node a new error-check code for the altered message with a predetermined number of computational operations, i.e. computational time, independent of the length of the message, while preserving the integrity of the initially computed error-check code of the message.

10 Claims, 3 Drawing Sheets

ERROR CHECK CODE RECOMPUTATION METHOD TIME INDEPENDENT OF MESSAGE LENGTH

This is a continuation of application Ser. No. 08/042.756, filed Apr. 6, 1993 and now abandoned which is a continuation of application Ser. No. 07/608,109, filed Nov. 1, 1990 and now abandoned.

BACKGROUND OF THE INVENTION

The invention relates broadly to data packet communication networks capable of transmitting a digitally coded data packet message including an error-check code from a source node to a destination node over a selected transmission link which includes at least one intermediate node operative to intentionally alter a portion of the message to form an altered message which is ultimately routed to the destination node, and more particularly, to a method of re-computing at the intermediate node a new error-check code for the altered message in a predetermined number of computational operations, i.e. computational time, independent of the length of the message, while preserving the integrity of the initially computed error-check code of the message.

In a data packet or frame-relay communication network, data packet messages are digitally encoded at a source node for transmission over a selected link of the network to a destination node thereof. To protect the integrity of the coded message against errors which may result from transmission or internodal activity, an error-check code is generated at the source node for the message using one of the well known error-check encoding algorithm, such as a cyclic-redundancy-check (CRC) algorithm, for example. The resulting CRC code is appended to the coded message at the source node prior to transmission.

In data packet networks, there is generally included one or more relay or intermediate nodes in the selected transmission link connecting the source and destination nodes. The intermediate node is operative to intentionally alter a portion of the message to form an altered message which is ultimately routed to the destination node. For example, a frame-relay intermediate node may remove its own destination address from the transmission header portion of the coded message and insert in place thereof the address of the next node in the transmission link before passing the altered message on. As a result of this alteration, the originally generated CRC code is no longer valid and must be recomputed based on the altered message. In so doing, the ability to detect errors introduced by preceding transmission and internodal activity should be preserved so that the CRC code received at the destination node will serve to ensure correct end-to-end transmission. Accordingly, any algorithm used to recompute a CRC code pattern at the intermediate node must also ensure end-to-end integrity all along the selected transmission link between the source and destination nodes of the network.

A classical approach for recomputing the CRC code at the intermediate node while preserving error detection integrity includes stripping off the originally generated CRC code from the received message and calculating another CRC code based on the actual coded message received, comparing the original and calculated CRC codes for the detection of errors introduced into the message over the preceding transmission link. If no errors are detected, a new CRC code is computed based on the altered message and the altered message along with the new CRC code are retransmitted together to the next node in the transmission link. If an error is detected, the received message may be dropped at the intermediate node or some default action taken. This classical approach is a process-intensive procedure in that it requires two CRC code encoding computational operations by a conventional byte-wise CRC encoder for each byte of the message, i.e. message length dependent.

Data packet messages normally range in length from 200 bytes to a maximum on the order of 8,000 bytes. Accordingly, using a message length dependent procedure for recalculating a CRC code to accommodate an altered message in an intermediate node of a network requires long computational intervals when the message is comprised of thousands of bytes. Computational times of this magnitude for recalculating CRC codes at intermediate nodes in a network will burden the throughput transmission rates and be prohibitive to data packet transmissions of an overall message like a voice message, for example.

It has been observed, that due to the linearity of CRC codes, the recomputation thereof may be simplified by computing a difference CRC code for the difference portion between the unaltered and altered data messages. The resultant difference CRC code may be added (modulo 2) to the original CRC code to form the new CRC code for the altered message. In this manner, the ability to detect errors in the message from end-to-end utilizing the CRC code thereof is preserved. Examples of such recomputational techniques are referred to in the following references:

(1) D. R. Irvin, "Preserving the Integrity of Cyclic-Redundancy Checks When Protected Text is Intentionally Altered," IBM J. RES. Develop., Vol. 33, pp. 618–626, received by the IEEE Dec. 16, 1988; and accepted for publication Nov. 21, 1989; and (2) CCITT Study Group XVIII, Question 3-XVIII, Contribution 14, "CRC4—Recommendation Amendments for an Automatic Interworking and Message Channel Capability," February, 1990.

However, the recomputation time of the foregoing described recomputational technique remains message length dependent for the computation of the difference CRC code and thus, may require up to a maximum of 8,000 or so computation operations therefor. Accordingly, this recomputation time for internodal transmission of data packet messages is still believed prohibitive for lengthy data messages.

The present invention provides for a recomputational procedure which overcomes the drawbacks of the foregoing described techniques by recomputing the CRC code in a computational time virtually independent of the message length. This computational procedure provides the highest gain for very long data messages and a small number of altered bytes.

SUMMARY OF THE INVENTION

A data packet communication network comprises a plurality of transmission links for interconnecting source and destination nodes of the network. One transmission link of the plurality is selected for conveying a digitally coded data packet message of a given length from a source node to a destination node. The selected transmission link concludes at least one intermediate node which is operative to intentionally alter a portion of the message to form an altered message that is ultimately routed to the destination node over the selected link. The message includes an error check code initially computed at the source node for use in detecting the presence of errors in the message effectuated during the transmission over the selected transmission link.

In accordance with the present invention, a method for recomputing, at the intermediate node, a new error-check code to be transmitted as part of the altered message to the destination node, while preserving the integrity of the initially computed error-check code, comprises the steps of: reading the content of the digitally coded message; deriving a representation of a difference message based on the read content of the message and knowledge of the intended alteration of the portion thereof, the difference message representation including a difference portion representation and a null portion representation; computing a difference error-check code for the difference message representation in a predetermined number of computational operations using an algorithm based on the difference portion and null portion representations thereof, the predetermined number being independent of the length of the message; and combining the initially computed error-check code with the difference error-check code to form a new error-check code for the altered message.

DESCRIPTION OF THE PREFERRED EMBODIMENT

Figure 1:
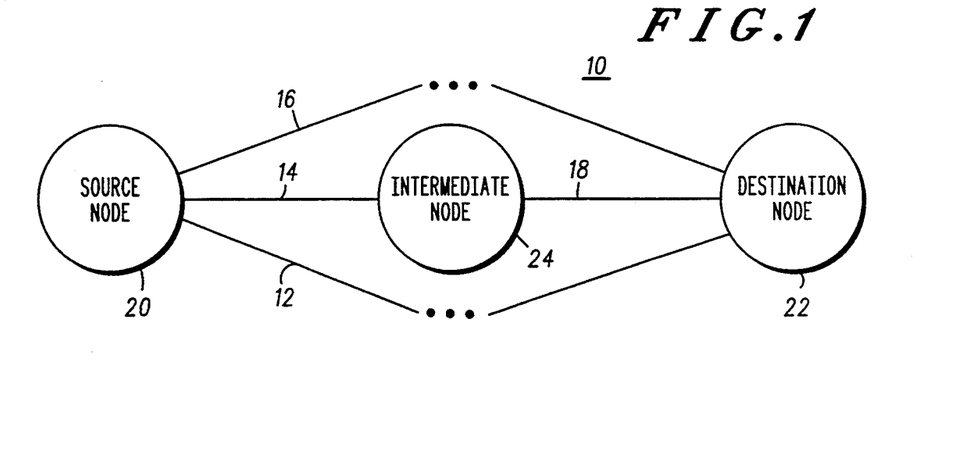
FIG. 1 is an illustration of a data packet communication network suitable for embodying the present invention.

In the illustration of FIG. 1 is depicted a data packet communication network 10 comprising a plurality of transmission links 12, 14 and 16 for interconnecting a source node 20 of the network to a destination node 22 thereof. One transmission link, say link 14, for example, of the plurality may be selected for conveying a digitally coded data packet message of a given length from the source node 20 to the destination node 22. The selected transmission link 14 may include at least one intermediate node 24 which is operative to intentionally alter a portion of the message to form an altered message that is ultimately routed to the destination node 22 over a selected link 18. An example of a well known communication node is described in the publication—F. E. Heart, R. E. Kahn, S. M. Ornstein, W. R. Crowther, and D. C. Walden, "The Interface Message Processor for the ARPA Computer Network," AFIPS Comp. Proc., 36, pp. 551–567, June 1970; which is incorporated by reference herein for providing the operational details thereof. The aforementioned reference exemplifies the type of network node which may be used for the source node 20, destination node 22 and intermediate node 24 of the foregoing described network 10.

Figure 2:
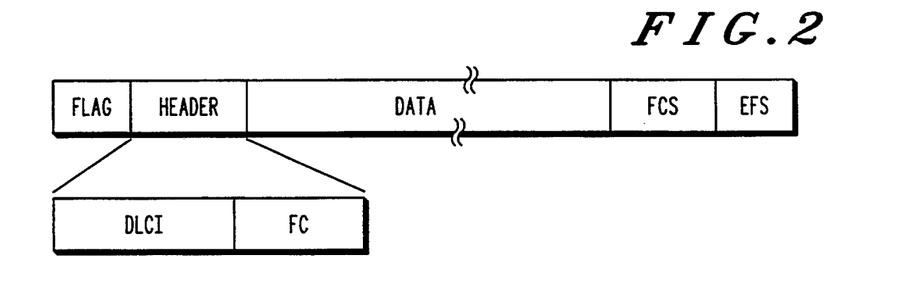
FIG. 2 is an illustration of a typical data packet message protocol which may be transmitted over a transmission link of the network of FIG. 1.

In FIG. 2 is illustrated a typical data packet message protocol which is conventionally transmitted over a transmission link in a digital bit sequence manner. The message protocol commences with a frame delimiting flag (FLAG) field which may have a field length of approximately 8 bits, for example. The next field in succession is referred to as the header field and may comprise on the order of 3 bytes. The data field follows and is generally variable in length including anywhere from 1 byte to 8,000 bytes, for example. The next field in succession is referred to as the frame check sequence (FCS) field and normally includes the CRC error check code which may be on the order of 16 to 32 bits in length. The message sequence ends with an ending flag (EFS) field of say 8 bits. In many applications, the header field comprises a data link identifier (DLCI) field on the order of 2 to 3 bytes and a frame control (FC) sub-field of approximately 8 bits. Normally in a data packet or frame relay communication system, it is the DLCI field or portion thereof of the message which is altered by the intermediate node 24. For example, the intermediate node may remove the DLCI in the frame on the incoming link 14 and insert a new DLCI in the frame for the outgoing link 18 before passing the altered message thereto. Thus, it is this alteration which requires modification of the CRC error check code within the FCS field of the data message.

Figure 3:
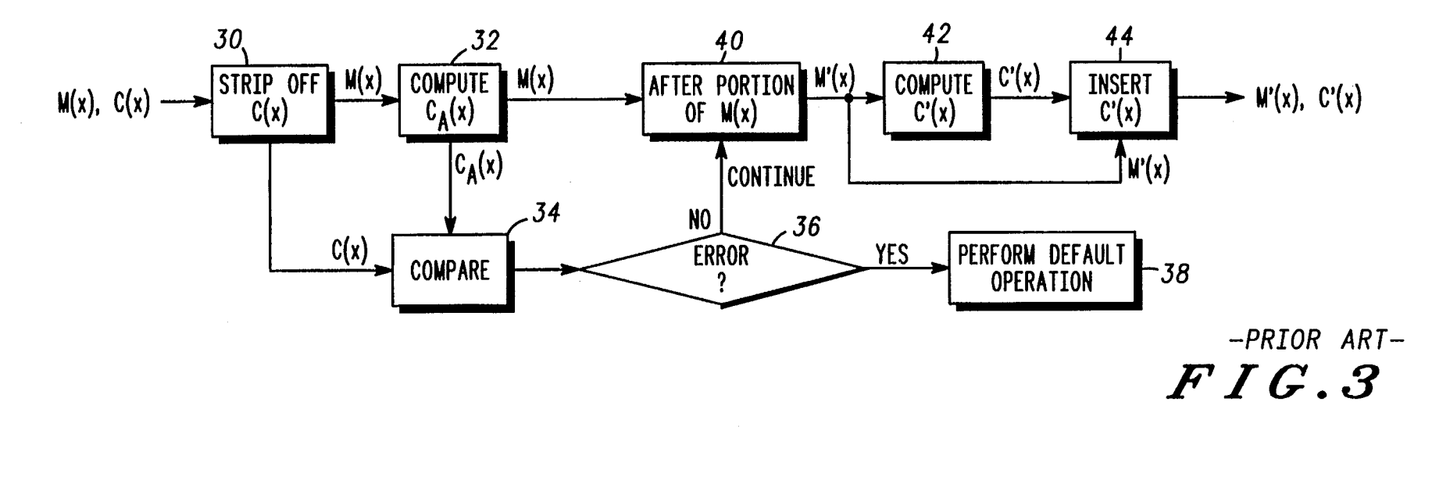
FIG. 3 is a functional block diagram representation of a classical (Prior Art) approach for recomputing a CRC code in an intermediate node of a data packet communication network.

FIG. 3 is a functional block diagram representation of the classical approach for recomputing a CRC code in an intermediate node as described here above in the Background section. In FIG. 3, the body of the data message is represented by M(x) and the error check code thereof is represented by C(x). Referring to FIG. 3, in an initial functional block 30, the error check code C(x) of the received data message is stripped from the received message for later use and the body of the message M(x) is passed on to the computational block 32 in which a CRC code represented by $C_A(x)$ is computed for the data sequence actually received. The error check codes C(x) and $C_A(x)$ are compared in the computational block 34 and it is determined in the decisional block 36 whether or not there is an error between the two error check codes. If an error is detected some predetermined default operation is performed in the functional block 38. Otherwise, a continuation of processing is permitted in computational block 40 wherein the desired portion (e.g. DLCI field) of the received message is altered. This is where a new DLCI may be substituted for the received DLCI as described supra. The altered message which is represented by M'(x) is passed on to the computational block 42 in which a new CRC code is generated and represented by C'(x). The new code C'(x) is appended to the altered message in block 44 and the resulting message M'(x), C'(x) is passed along to the next node in the transmission link.

Note the complexity of the foregoing described recomputational technique. For example, the technique requires stripping the originally generated CRC code from the received message, computing a CRC code based on the actually received data sequence and comparing of the two codes, and thereafter requires a second computation of the new CRC code for the altered message. Both of the CRC computational steps require conventional CRC encoders which are highly dependent on the message length in which case the computational time varies directly proportional to the length of the message.

Figure 4:
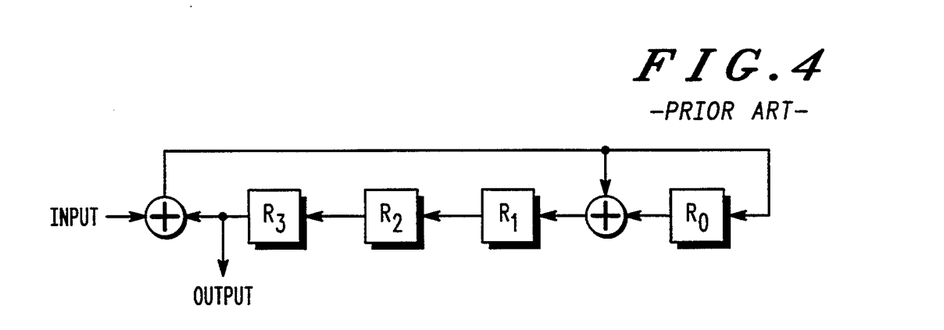
FIG. 4 is a functional block diagram illustration of a conventional (Prior Art) CRC encoder for a 4 bit CRC code.

In FIG. 4 is shown a functional block diagram illustration of a conventional CRC encoder for a 4 bit (P0,P1,P2 and P3) CRC code. In the present example, the arrangement of the encoder operational blocks is based on a generating polynomial $g(x)=X^4+X+1$. In operation, a message may be sequenced through the encoder from input to output either byte-wise, i.e. advanced 8 bits at a time, or bit-wise, i.e. single step 1 bit at a time. Accordingly, a computational operation consumes a byte of data in the byte wise operation of the encoder and consumes a bit of data in the bit wise or single step operation of the encoder. Therefore, for a data message comprising thousands of bytes each computational stage 32 and 42 of the embodiment described in connection with the functional diagram of FIG. 3 requires thousands of computational operations which, as indicated above, renders prohibitive data packet message transmission in a network.

Figure 5:
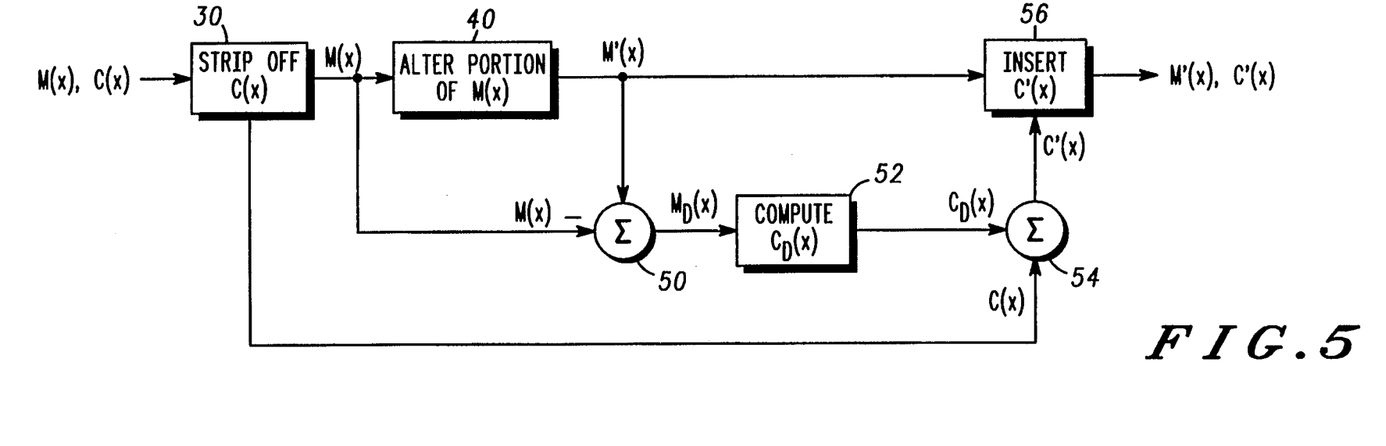
FIG. 5 is a functional block diagram schematic of an improved technique for recomputing CRC codes.

FIG. 5 depicts a functional block diagram schematic of an improved recomputational technique which was introduced by the references (1) and (2), supra. In this technique, the operations of stripping off the original CRC code from the received message and altering a portion thereof is still performed in similarly numbered blocks 30 and 40, respectively, as that of the technique described in connection with the embodiment of FIG. 3. However, in the instant embodiment of FIG. 5, the altered and unaltered messages are subtracted in a summer block 50 yielding a difference message represented by $M_D(x)$. In a computational block 52, a difference CRC code represented by $C_D(x)$ is computed for the difference message $M_D(x)$ and added to the original CRC code in the summer 54. The resultant CRC code represented by C'(x) is inserted or appended to the altered message to form the altered data message M'(x), C'(x).

Note that, in the instant technique, the operations associated with error detection at the intermediate node including the CRC encoding operation based on the actual bit sequence of the received message are eliminated. However, the encoding of the difference CRC code in the computational block 52 is performed using a classical CRC encoder such as that described in connection with the embodiment of FIG. 4 expanded to 16 or 32 bits of CRC code. Once again it is pointed out that the computational time for recomputing a CRC code using the classical CRC encoder depends linearly on the number of bytes in a data message. That is, for a long message the encoding step may require thousands of byte wise computational operations.

Figure 6:
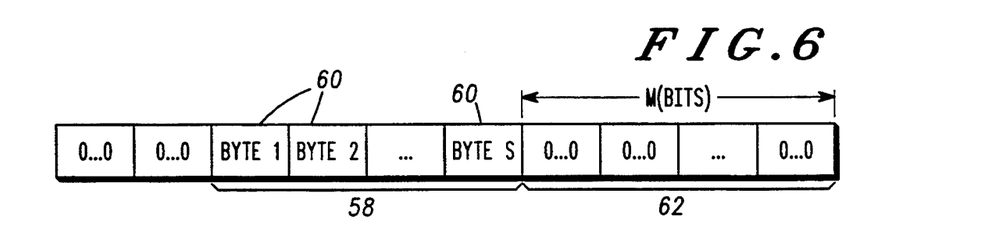
FIG. 6 is an illustration of a difference message format including a difference portion and a null portion for use in explaining an embodiment of the invention.

An example of a difference message $M_D(x)$ is shown by the illustration of FIG. 6. The difference message includes a difference portion 58 which comprises a difference sequence of bits or bytes 60. The difference portion 58 may be preceded in some cases by a number of zero coded or null bits which are immaterial to the recomputation of the CRC code. Further included in the difference message is a null portion 62 which comprises m binary coded zero or null bits trailing the difference portion.

Figure 7:
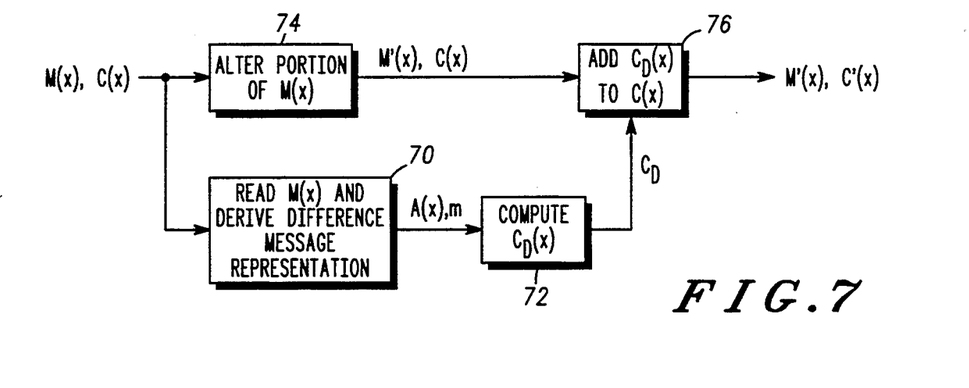
FIG. 7 is a functional block diagram schematic of an embodiment for computing the CRC code of the difference message in accordance with the principles of the present invention.

In accordance with the present invention, a recomputational technique for computing the CRC code of the difference message based on knowledge of the altered portion 58 and the number m of null bits in the null portion trailing the difference portion 58 is illustratively depicted in the functional block diagram of FIG. 7. Unlike the previously described recomputational techniques, the complexity of the embodiment depicted in FIG. 7 is virtually independent of the length of the message. In addition, many other operational steps are eliminated by the instant embodiment in comparison to the foregoing described embodiments of FIG. 3 and FIG. 5.

Referring to FIG. 7, the received message M(x) is read in the functional block 70 and a difference message representation is derived therefrom based on knowledge of the intended alteration of the portion thereof. The difference message representation includes a difference portion representation and a null portion representation. In the present embodiment, the difference portion representation is the digital sequence code of portion 58 represented by the term A(x) and the null portion representation is the number of bins m in the null portion 62. The difference error check code $C_D(x)$ is computed in block 72 by a predetermined number of computational operations using an algorithm based on the different portion A(x) and null portion m representations of the difference message representation. The computational time consumed by the predetermined number of computational operations in computing the difference error check code is independent of the length of the message.

Continuing, the portion of the message is altered in block 74 and in block 76 the computed difference CRC code is added to the received CRC code to yield the new CRC code C'(x) which is appended to the altered message M'(x). As explained above, in most cases, the alteration to the message affects only the address field thereof which in the frame-relay case, for example, is restricted to 2,3,4 bytes of encoded data. However, the trailing null portion 62 of the difference message may include up no 64,000 bits.

In theory, the algorithm used in block 72 of the present embodiment for recomputing the CRC code for an altered message is based on the algebra of Galois fields and the fact that the generating polynomial g(x) for generating the CRC code is irreducible of degree r. For a more detailed description of Galois fields, irreducible polynomials and other terms used in the following description, references made to the text F. J. Mac Williams, N. J. A. Sloane, "The Theory of Error-Correcting Codes," North Holland, and more particularly pages 88–92 thereof. Continuing, consider the finite Galois field $GF(2^r)$ of all polynomials of degree less than r with binary coefficients and addition and multiplication modulo g(x). The non zero elements of such a field form a cyclic group of order $2^r-1$, that is, there exists a primitive element $\alpha$ in a group such that $\alpha^0, \alpha^1, \alpha^2, \ldots, \alpha\exp(2^r-2)$ are the non zero elements of the field. The term "exp" used throughout this application is intended to mean taken to the power of. A polynomial having a primitive element as a zero is called a primitive polynomial.

Further, each such element in the field can be described as a polynomial of degree less than r, as an r-tuple, or as a power of $\alpha$, which power being the logarithm representation of the corresponding r-tuple. Accordingly, a table such as that shown below in Table 1 may be configured for the different representations of $GF(2^4)$ generated by $\alpha^4 + \alpha + 1 = 0$. Note that each element's polynomial representation is reached by taking the previous polynomial (the previous element and its logarithm), multiplying it by $\alpha$, and adding g(x) to the polynomial if the polynomial after the shift is of degree r.

TABLE 1

$(GF(2^4)$ generated by $(\alpha^4 + \alpha + 1 = 0)$.

| as a 4-tuple | as a polynomial | as a power of $\alpha$ | logarithm |
|---|---|---|---|
| 0000 | 0 | 0 | $-\infty$ |
| 0001 | 1 | $\alpha^0$ | 0 |
| 0010 | $\alpha$ | $\alpha^1$ | 1 |
| 0100 | $\alpha^2$ | $\alpha^2$ | 2 |
| 1000 | $\alpha^3$ | $\alpha^3$ | 3 |
| 0011 | $\alpha + 1$ | $\alpha^4$ | 4 |
| 0110 | $\alpha^2 + \alpha$ | $\alpha^5$ | 5 |
| 1100 | $\alpha^3 + \alpha^2$ | $\alpha^6$ | 6 |
| 1011 | $\alpha^3 + \alpha + 1$ | $\alpha^7$ | 7 |
| 0101 | $\alpha^2 + 1$ | $\alpha^8$ | 8 |
| 1010 | $\alpha^3 + \alpha$ | $\alpha^9$ | 9 |
| 0111 | $\alpha^2 + \alpha + 1$ | $\alpha^{10}$ | 10 |
| 1110 | $\alpha^3 \alpha^2 + \alpha$ | $\alpha^{11}$ | 11 |
| 1111 | $\alpha^3 + \alpha^2 + \alpha + 1$ | $\alpha^{13}$ | 13 |
| 1001 | $\alpha^3 + 1$ | $\alpha^{14}$ | 14 |

Referring to the classical CRC decoder described in connection with the embodiment of FIG. 4, if a binary 1 is placed in the right most storage device and binary 0's in the other storage devices, i.e. P1, P2, and P3, and if the input sequence consists of null bits, then successive shifts will yield representations of successive powers of $\alpha$, in exactly the same form as they appear in Table 1 above. If the encoder embodiment of FIG. 4 is loaded instead with the r-tuple representation of some element $\alpha^j$ of the field, then successive shifts will produce the elements $\alpha^{j+1}, \alpha^{j+2}, \ldots$. After m successive shifts, the registers of the embodiment will store the r-tuple representation of $\alpha^{j+m}$.

Now, if the difference sequence 58 of the altered data message is less than r bits long, followed by m null bits, then computation of the difference CRC code may be performed by loading the registers of the encoder embodiment depicted in FIG. 4 with the difference sequence of the altered message, and successively shifting the data in the registers by m steps, while concurrently feeding at the input null bit data. Accordingly, this is equivalent to (a) finding the logarithm of the difference portion or digital sequence 58, (b) adding m to the algorithm (modulo $2^r - 1$), and (c) converting the result, which may be considered a new logarithm of the field, into its corresponding r-tuple.

It follows that the instant computational method includes the steps of using the digital code of the difference sequence 58 as the code of r-tuple of the galois field converting the code into its corresponding logarithm j of the field; adding the number m+r of the corresponding null sequence to the converted logarithm j modulo $(2^r - 1)$ to yield the sum $(m+r+j)$ modulo $(2^r - 1)$; and using the resultant sum as another logarithm of the field for inversely converting the another logarithm to its corresponding r-tuple digital code which becomes the difference CRC code C'(x) for the difference message.

For CRC codes with short primitive generating polynomials g(x), a look-up table similar to that shown in Table 1 above may be configured to convert an r-tuple digital code to its corresponding logarithm of the field. In addition, another look-up table using Table 1 as an example may be configured to inversely convert an algorithm of the field to a corresponding digital code of its r-tuple. Thus, the converting step of the foregoing described method may include the step of using the digital code of the difference sequence to look-up its corresponding logarithm of the field in the first table, and the inversely converting step may include using the resultant sum to look up its corresponding r-tuple digital code of the field in the second table. Note that in the above described method the logarithm accessed from the first table is incremented by (m+r) rather than m because the CRC code computation is executed on $X^r d(x)$, where d(x) is the input polynomial.

An example of a software implementation of the foregoing described table look-up technique is shown below by Procedure 1:

```
short _primitive_g( )
{
    logarithm = table 1 [r_tuple];
    new_logarithm = (logarithm + m + r) % (2^r - 1_);
    checksum = table2 [new_logarithm];
}
```

As an example of the above procedure, if a 4 bit CRC code requires recomputation using the generating polynomial $g(x) = x^4 + x + 1$, and the input message in binary is 1010, 0000, 0000, 0000, then using the difference sequence 1010 its corresponding logarithm 9 may be accessed from the first look-up table (refer to Table 1, for example). Since the number of trailing bits m is 12, the resulting sum becomes (9+12+4). Since r=4, the modulo argument becomes 15, whereby the sum modulo (15) = 10. Using 10 as the new logarithm, it is possible to go back to Table 1 above to inversely convert the new logarithm 10 to its r-tuple representation which is 0111. The digital code 0111 is the difference CRC code which is added to the original CRC code to complete the recomputation of the new CRC code for the altered message as described in connection with the embodiment of FIG. 7.

Practically, CRC codes are not simply 4 bit but rather on the order of 16 bit or larger. Thus, for a 16-bit CRC code, each of the look-up conversion tables will require 2×64K bytes in order to store all of the conversion elements needed for the look-up operations. In the event that a network node cannot meet the memory requirements of the conversion tables, the memory requirements may be reduced commensurately at the expense of increased computational operations.

Figure 8:
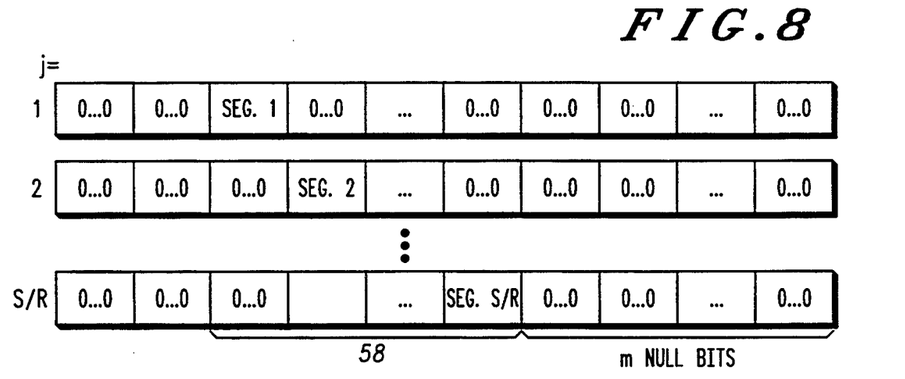
FIG. 8 illustrates the techniques of an alternate method for embodying the principles of the present invention.

For example, suppose that a difference sequence 58 is s-bit long. The s-bit difference portion may be divided into j = s/r segments of r-bits each, where r = 8 bits or 1 byte may be a convenient choice. Using the r-bit sub sequences, the difference message may be divided into j separate difference messages as depicted in the illustration of FIG. 8. Referring to FIG. 8, note that the difference portion of the ith difference message includes t(i) binary 0 bits from the end of the corresponding r-bit subsequence to the beginning of the null sequence, i.e.

t(i)=s−ri. Accordingly, j sub difference CRC codes may be computed for the j difference messages and summed (modulo 2) to compute the difference CRC code of the difference message. This may be accomplished by using each r-bit subsequence as an r-tuple of the galois field and converting the digital code thereof into its corresponding logarithm i of the field. Then, adding the respectively corresponding number m+r+t to each converted logarithm i modulo $(2^{r-1})$ to yield the respective j subsums thereof. Finally, the corresponding r-tuple digital codes may be inversely converted using each of the j subsums thereof as other logarithms of the field to yield the j sub-difference CRC codes.

It is understood that look-up tables may be used in the converting and inversely converting steps, but these look-up tables require only $2^r$ entries, i.e. for r=8, each memory table needs only 256 bytes. This reduction in memory size is not without cost. That is, the complexity of the difference CRC code computation is increased by the factor of s/r. Note that if the address code alteration involves only 2 bytes, this factor is 2 or if it involves 3 bytes, this factor is only 3.

As an example, suppose that the difference message in binary is 0110,1011,1001,0000,0000,0000,0000,0000 and a 4 bit CRC code is to be computed. For this example, r=4, M=20 and the difference message may be separated into three separate difference messages as follows:

0110,0000,0000,0000,0000,0000,0000,0000     (1)

0000,1011,0000,0000,0000,0000,0000,0000     (2)

0000,0000,1001,0000,0000,0000,0000,0000     (3)

The r bit difference segments 0110,1011,1001 corresponding to the three separate differences messages may be used to access correspondingly their logarithms 5,7, and 14 from the conversion table, using Table 1 above, for example. The respective subsums become (5+8+20+4) modulo (15), (7+4+20+4) modulo (15), and (14+20+4) modulo (15) which yield the numbers 7, 5 and 8, respectively. Using these subsums as other logarithms, their r-tuple inverse conversions may be accessed from the conversion table to yield the sub difference CRC codes 1011,0110, and 0101 which when summed (modulo 2) yields the difference CRC code 1000 for difference message.

Figure 9:
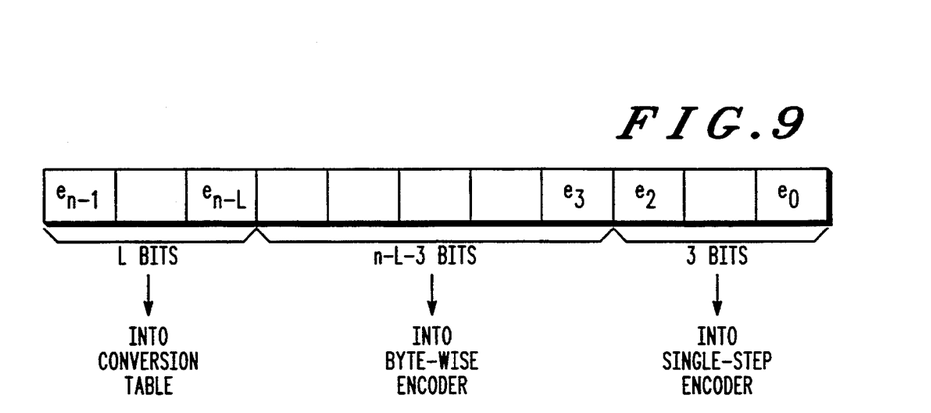
FIG. 9 is an illustration of yet another method for embodying the principles of the present invention.

The foregoing described procedure involves reasonable memory allocations for the inverse conversion look-up as long as m is small. However, as a practical matter m which is the number of null bits in the null portion of the difference message may be as high as 64,000 bits, whereby a very large memory table will be required to performed the inverse conversion from the subsums. Suppose for example that the inverse conversion table is restricted to only $2^L$ entries. Then, only the L most-significant bits $e_{m-1}, e_{m-2} \ldots, e_{m-L}$ of the subsum logarithm may be used as a pointer into the inverse conversion table to access the r-tuple representation of the corresponding different message $e_{m-1}, e_{m-2} \ldots, e_{m-L}$, 0,0, . . . 0 which is shown in the illustration of FIG. 9. Referring to FIG. 9, the next (n−L−3) MSBs are used to count the number of accesses into the byte-wise encoding table. Last, the remaining 3 LSBs determine the number of single-step encoding cycles. This process is summarized in the software procedure 2 shown below.

```
primitive_g( )
{
  s  number altered bits
  m  number of trailing nulls
  while (not end of altered block) {
    t_bits=get_data ( );
    logarithm=table1 [t_bits];
    new_logarithm=(logarithm+ m + s − t · j +r) % (2^r−1);
    checksum=table2[new_logarithm[e_n−2, . . . , e_n−L]];
    for (e_n−L−1,e_n−L−2, . . . , e_3),times
      checksum=byte_wise_encode(checksum) ;
    for (e_2,e_1,e_0) times
      checksum=bit_wise_encode(checksum) ;
    final_remainder=final_remainder  remainder;
  }
}
```

Another approach to reducing look-up table size for the inverse conversion of the j subsum logarithms is to divide each of the j subsums by a predetermined value c to yield for each subsum i, $k_i$ segments with a remainder $R_i$ as expressed below:

$$\text{subsum } i=(i+m+r+t)=ck_i+R_i.$$

Thereafter, intermediate corresponding r-tuple digital codes $Y_i$ may be inversely converted using the $k_i$ values as the other logarithms of the filed. Then, each $Y_i$ code may be bit-wise passed $R_i$ times through as classical CRC encoder similar to the one described in connection with FIG. 4, generated by the generating polynomial g(x) to yield the j subdifference CRC codes.

An inverse conversion look-up table may be configured when the $k_i$ values may be used as the logarithm of the field and their r-tuple codes may be the accessible storage element thereof. In this connection suppose m is on the order of 64,000 and c is chosen to be 16, then $k_i$ max is about 4,000. Therefore, an inverse conversion table of 2×4k bytes may be used for each of the subsum i inverse conversions, presuming a 16 bit CRC code. Accordingly, the inverse conversion table is reduced by a factor of c.

Furthermore, commonly used CRC polynomials may not be irreducible, but consistent of an irreducible polynomial multiplied by a factor (X+1). This description deals specifically with 16-bit CRCs by way of example only. The CCITT-16 polynomial $g(x)=x^{16}+x^{12}+x^5+1=(x+1)g'(x)$, is used in the example, where $g'(x)=x^{15}+x^{14}+x^{13}+x^{12}+x^4+x^3+x^2+x+1$. The (x+1) factor adds a parity bit to the checksum computed by the polynomial g'(x). Suppose r'(x) is the checksum computed on $x^r \cdot d(x)$, where d(x) is the input polynomial. Then, r(x), the checksum for g(x) is equal to g'(x) [parity of $x^r d(x)+r'(x)]+r'(x)$.

The input sequence d(x) is processed one byte at a time (i.e. t=8). Memory-complexity tradeoffs are determined by the size of conversion tables, supra. In the instant example, an 8K byte table may be used, such table being reduced at the expense of additional accesses into the byte-wise encoding table. Complexity may be reduced by using a table for computing the parity. An example of the computation of the remainder of a 16-byte CRC code with a polynomial g(x)=(x+1) g'(x) is shown by the software procedure below.

```
/*************************************************/
#define   TABLE2_SIZE     4096
```

-continued

```
#define         POLY        0xF01F
/***********************************************************/
/*              Compute the parity of a byte               */
/***********************************************************/
int   parity(input)
unsigned char    input;
{
    int    i;
    int    count=0;
    int    mask=1;
    for  (i=0; i<8 ; (mask =mask << 1), ++i )
       if ((input & mask) != 0)
          count+count   0x1;
    return (count);
}
/***********************************************************/
/*                    main function                        */
/***********************************************************/
main( )
{
    int        i, j;
    int        table1 [256], table2[TABLE2_SIZE], byte;
    int        num_z, fr_size, shift;
    long int   exponent;
    unsigned short   remainder;
    int        carry, check;
    /************* get inputs ****************/
    printf("enter number of non-zero bytes n");
    scanf("%d",&fr_size);
    printf("enter number of trailing null bytes n");
    scanf("%d",&num_z);
    shift+(num_z+fr_size)<<3;   /*number of trailing zeros */
    /************* compute remainders *************/
    for (j=1; j<=fr_size; ++j) {
       shift--=8;   /*number of trailing zeros */
       printf("enter byte number %d of data vector(in HEX)  n",j);
       scanf("%2x",&byte);
       exponent=table1[byte];   /*byte --> logarithm*/
       exponent=exponent + shift + 16;
       /* logarithm of remainder */
       while
          ( (exponent & 0xFFFF8000) !=0)   /*rem modulo (2 15)−1*/
          exponent=(exponent & 0x00007FFF) + (exponent >> 15);
       remainder=table2[exponent >> 3];
       /* exponent → binary rep */
       for (i=(exponent & 0x07); i>0; --i )   {
          carry=remainder & 0x4000;
          remainder=remainder << 1;
          if (carry)
             remainder=remainder- POLY;
       }   /* Here we have the remainder modulo g'(x) */
       check=parity(byte)  parity(remainder >>8)  parity(remainder & 0xFF);
                /* Compute the remainder modulo g(x) */
       if (check == 1)
          remainder  =POLY;
    }
    printf(" n Final remainder=%4x  n",remainder);
}
```

An alternate method for computing the difference CRC code uses the fact that any integer may be represented as a sum of binary 2's powers, i.e. $\Sigma 2\exp(k_i)$ and properties of Galois field multiplication and squaring to achieve the computation complexity of $\text{Log}(k)$ for a frame size $k=m+r$. In the present method, the difference CRC code is computed by the expression:

$$X^k d(x) \text{ modulo } g(x) \text{ over } GF(2),$$

where k is a number representing the null sequence of the message, d(x) represents the digital code of the difference sequence thereof, GF(2) represents a finite Galois field.

Suppose the binary expansion of integer m is $m_{n-1}, \ldots m_1, m_0$, where $m_i$ is a member of the set $[0,1]$, $i=0, \ldots, n-1$, then m can be generated recursively in $n=\log_2(m)$ steps as follows:

$$z = m_{n-1},$$

for $i=n-2$ to 0, $z=2z+m_i$.

Similarly, the following algorithm generates $z(x)=x^m \bmod g(x)$ in n steps:

$$z(x) = x\exp(m_{n-1})$$

for $i=n-2$ to 0, $z(x)=z^2(x) x\exp(m_i) \bmod g(x)$.

Note that $z^2(x) x\exp(m_i) \bmod g(x) = (z^2(x) \bmod g(x)) x\exp(m_i) \bmod g(x)$.

Accordingly, it is recognized that the above described algorithm computes the resultant term $z(x)=x^k \bmod g(x)$ in n steps where $n \leq r$, by initially setting $z(x)=x\exp(m_{n-1})$ for the first step, and then recursively generating z(x) for the steps $i=n-2$ to 0, by the expression $z(x)=z(x)^2 \cdot x\exp(m_i)$. Thereafter it is further recognized that by performing a Galois multiplication of the foregoing described resultant term by $d(x) \bmod g(x)$ over GF(2), the difference CRC code is yielded.

By way of example, if a 16 bit CRC code is being generated by the foregoing described algorithm, i.e. $r=16$, and no memory is available for the computation, then each of the squaring computations $Z(x)^2$ use 16 operations each which for 16 recursive iterations consumes 256 operations. This taken together with the 16 multiplications $Z(x)^2 X\exp(m_i)$ during the recursive iterations consumes a total of 272 operations for computing the intermediate term $x^m \bmod g(x)$ which is then multiplied by $d(x) \bmod g(x)$ to yield the desired difference CRC code. For $r=16$, the final multiplication step will use 16 multiplication operations to yield the 16 bit CRC code. These operations added to the previous total of 272 operations yields a grand total of approximately 288 operations for computing the difference CRC code under the instant method.

With available memory at the intermediate node, the number of computational operations may be reduced substantially by using a direct table look-up for the squaring operations of $z^2(x)$ which requires a table size of $2\exp(\deg(g(x)))$, where for the present example $\deg(g(x))$ is 16. The table size in this case may be too large to be practical, i.e. 128 k bytes. If this is the case, it is recognized that some tradeoff may be made between the table size and the computation complexity. For example, for any two polynomials a (x) and b(x) over GF(2) we have:

$$(a(x)+b(x))^2 = a^2(x)+b^2(x)+2a(x)b(x) = a^2(x)+b^2(x).$$

Therefore, we may express z (x) by the sum of two polynomials as follows:

$$z(x) = z_a(x)x^n + z_b(x),$$

where n is an integer less than $\deg(g(x))$ or r, and both $z_a(x)$ and $z_b(x)$ are polynomials with degree less than r, then the total table size will be $2\exp(\deg(z_a(x))) + 2\exp(\deg(z_b(x)))$. Thus, table 1 may be configured of a size $2\exp(\deg(z_a(x)))$ for the squaring operation of the term $z_a(x)$ and a table 2 may be configured of a size $2\exp(\deg(z_b(x)))$ for the squaring operation of the term $z_b(x)$; and z(x) may be recursively generated in r steps by initially setting $z(x)=x\exp(m_{r-1})$ for the first step and then computing z(x) for the steps i=r−2 to 0 by the expression:

(Table 1[$z_a$]+Table 2[$z_b$])·xexp($m_i$), where $z_a$=coefficient of z(x) with powers higher than t−1, $z_b$=coefficient of z(x) with powers lower than t, Table 1(y)=$y^2$mod g(x) and Table 2(y)=$(2^n y)^2$mod g(x), for y=0 to $2^{t-1}$ as the coefficient of a polynomial up to degree t−1.

Since deg(z(x)) is limited to t−1, choosing r=½ deg(g(x)) gives the smallest overall table size for both tables 1 and 2. When g(x) has a degree 16 as described in the above example, the instant method uses two tables both of size 256 each. In the above given algorithm, then t−1 becomes 7 and t becomes 8 and $2^{t-1}$ becomes 255. Of course it is realized that further partitioning of the coefficients of z(x) can be accomplished for further reduction of table size if necessary. That is, in general, $\Sigma a_i(x)^2 = \Sigma a_i^2(x)$ in GF(2).

After $x^k$mod g(x) is obtained by the instant algorithm, multiplying by d(x)mod g(x) may be accomplished using a shift-n-exclusive-or multiply scheme as is well known in the pertinent art to achieve the difference CRC code. An exemplary program for carrying out the foregoing described method embodiment is shown below:

---
PROCEDURE 4
---
```
$type xj2.c
/* a program to verify the algorithm of computing x k*d0 by
    Ping Dong
*/
#define fbc 0x4003    /* feed back coeff. of g(x) */
int tb11[256],tb12[256];
/*compute x1* x2 mod g(x) over GF (2)*/
mpy(x1,x2)
unsigned int x1,x2;
{
    long m=0;
    int i;
    for (i=15;i>=0;i−−) {
        if (x1&1<<i) m    = (long)x2<<i;
        if (m&(long)1<<(16+i)) m =(long) fbc<<i;
    }
}
/*initial building of table x 2, and table (256x) 2, x=0, ... ,255 */
build_tbl( )
{
    int k;
    for(k=0;k<256;k++) {
        tb11[k] = mpy (k,k);           /* low byte */
        tb12[k] = mpy (256*k,256*k);   /*high byte */
    }
}
/*compute x j*d0 mod g (x) */
xpj (j,d0)
int j,d0;
{
    int i,d;
    long m;
    d = 1;
    for(i=0;i<16;i++) {
        d = tb11[d&255] tb12[ (d>>8) &255];
        if (j&0x8000) {
            if (d&0x8000) d = 2*d fbc;
            else d = 2*d;
        }
        j<<=1;
    }
    return mpy (d,d0);
}
/*verify the algorithm by direct computation of x 1*k for
    all k and 1
*/ main ( )
{
    int k, 1, s, t;
    build_tbl( );
```

---
PROCEDURE 4 -continued
---
```
    for (k=1;k!=0xffff;k++) {
        s = xpj (l,k);       /*s = x 1*k */
        if (t&0x8000) t = 2*t  fbc;   /*t = x 1*k directly */
        else t = 2*t;
        if ((s  t)&0xffff) printf("%x %x %x %x n",k,l,s,t);
    }
}
```

In summary, the variety of methods presented above for embodying the invention permits decisions to be made in trading off between computational complexity, i.e. allowable computation time for interperiod transmission of data packet messages, and available memory at the intermediate network node If sufficient memory is available, then the former method may be used with the least number of computational operations. If, no memory is available, then the latter method without memory option may be used which requires the most operations. Finally, if limited memory is available, i.e. less than needed for the former method, then the latter method with memory option may be used which provides more computational operations than the former, but less than the latter without the memory option.

While the present invention has been described in connection with a limited number of specific embodiments as described hereabove, it is understood that modifications and additions may be made thereto and even other equivalent embodiments may be used without deviating from the broad principles thereof. Accordingly, the present invention should not be limited to any single embodiment, but rather construed in scope and breadth according to the recitation of the appended claims.

We claim:

1. In a data packet communication network comprising a plurality of transmission links for interconnecting a source node of the network to a destination node of the network, one of said plurality of transmission links being selected for conveying a digitally coded data packet message of a given length from the source node to the destination node, the selected transmission link including at least one intermediate node which intentionally alters a portion of the message to form an altered message that is ultimately routed to the destination node over said selected link, said message including an error-check code initially computed at the source node for use in detecting the presence of errors in said message effectuated during transmission over the selected transmission link, a method for recomputing at the intermediate node a new error-check code to be transmitted as part of the altered message to the destination node, while preserving the integrity of the initially computed error-check code, said method comprising the steps of:

(a) determining, by an intermediate node of the selected transmission link, a read content of the digitally coded message;

(b) deriving, by the intermediate node, a representation of a difference message based on said read content of the message and knowledge of the intended alteration of the portion thereof, said difference message representation including a difference portion representation and a null portion representation having zeros trailing the difference portion;

(c) computing, by the intermediate node, a difference error-check code for said difference message representation in a predetermined number of computational operations using an algorithm based on the difference portion and null portion representations thereof, said predetermined number being independent of the length of said message; and (d) combining, by the intermediate node, the derived computed error-check code with the derived difference error-check code to form said new error-check code for the altered message, wherein the message includes a sequence of digitally coded bits; the difference portion representation includes a sequence of a digitally coded bits and the null portion representation represents a sequence of m bits all coded a binary zero;wherein the error-check code includes a cyclic-redundancy-check (CRC) code generated by a generating polynomial g(x) for a finite Galois field $GF(2^r)$, where r is an integer, and where a difference CRC between unaltered and altered data messages is selected to be computed by the expression $X^m$ d(x) modulo g(x) over GF(2), where d(x) represents the digital code of the difference sequence and GF(2) represents a finite Galois field, step (c) includes the steps of:

expanding m into a binary expression represented by the terms $k_{r-1}, \ldots k_2, k_1, k_0$, where $k_i$ is an element of a set 0 and 1;

computing a resultant term $Z(x) = X^m$ mod g(x) in r steps by initially setting Z(x) equal to xexp($k_{r-1}$) for the first step and then recursively generating Z(x) for the steps i=r−2 to 0, by the expression $Z(x) = Z(x)^2$ xexp($k_i$); and thereafter, performing a Galois field multiplication of the resultant term Z(x) times d(x)mod g(x) over GF(2) to yield the difference CRC code.

2. The method in accordance with claim 1 wherein step (c) includes the steps of:

using the digital code of the difference sequence as the code of an r-tuple of the Galois filed, converting said code into its corresponding logarithm j of the field;

adding the number m+r of the corresponding null sequence to the converted logarithm j modulo ($2^r-1$) to yield a sum (m+r+j) modulo ($2^r-1$); and using said sum as another logarithm of the field, inversely converting said another logarithm to its corresponding r-tuple digital code which becomes the difference CRC code for the difference message.

3. The method in accordance with claim 2 including the steps of:

configuring a first look-up table to convert an r-tuple digital code to its corresponding logarithm of said field; and configuring a second look-up table to inversely convert a logarithm of the field to the corresponding digital code of its r-tuple; and wherein the converting step includes the step of using the digital code of the difference sequence to look up its corresponding logarithm of the field in the first table; and wherein the step of inversely converting includes the step of using the sum to look up its corresponding r-tuple digital code of the field in the second table.

4. The method in accordance with claim 1 wherein step (c) includes:

dividing the digital code of the difference sequence into j separate r-bit subsequences;

using each r-bit subsequence as an r-tuple of the Galois field, converting the digital code of each r-bit subsequence into its corresponding logarithm i of the field;

adding the number m+r+t to each converted logarithm i modulo ($2^r-1$) to yield j subsums (m+r+t+i) modulo ($2^r-1$), where t represents the trailing number of bits from the end of the corresponding r-bit subsequence to the beginning of the null sequence;

using each of said j subsums as other logarithms of the field, inversely converting each of said other logarithms to its corresponding r-tuple digital code yielding j subdifference CRC codes; and summing (modulo 2) said j subdifference CRC codes to compute the difference CRC code of the difference message.

5. The method in accordance with claim 4 including the steps of:

configuring a first look-up table to convert an r-tuple digital code to its corresponding logarithm of said field; and configuring a second look-up table to inversely convert a logarithm of the field to the corresponding digital code of its r-tuple; and wherein the converting step includes the step of using the digital code of each r-bit subsequence to look up its corresponding logarithm i of the field in the first table; and wherein the step of inversely converting includes the step of using each subsum to look up its corresponding r-tuple digital code of the field in the second table.

6. The method in accordance with claim 4 wherein the step of inversely converting includes the steps of:

dividing each subsum i of the j subsums by a predetermined value c to yield for each subsum i, $k_i$ value with a reminder Ri;

using the $k_i$ values as other logarithms of the field, inversely converting each of said other logarithms to its corresponding r-tuple digital codes represented by $Y_i$;

passing each $Y_i$ code through a bit-wise CRC encoder, generated by the generating polynomial g(x), Ri times to yield the j subdifference CRC codes.

7. The method in accordance with claim 6 including the steps of:

configuring a first look-up table to convert an r-tuple digital code to its corresponding logarithm of said field; and configuring a second look-up table to inversely convert a logarithm of the field to the corresponding digital code of its r-tuple; and wherein the converting step includes the step of using the digital code of each r-bit subsequence to look up its corresponding logarithm i of the field in the first table; and wherein the step of inversely converting includes the step of using each $k_i$ value to look up its corresponding r-tuple digital code $y_i$ of the field in the second table.

8. The method in accordance with claim 1 including the step of configuring a look-up table of a size 2 deg g(x) for the squaring operation of the term Z; and wherein the computing step includes the step using the term Z to look up its square $Z^2$ in said look-up table for each step $i=r-2$ to 0 during the recursive generation of the resultant term Z.

9. The method in accordance with claim 1 wherein the computing step includes the steps of splitting the term $Z(x)=x^m \bmod g(x)$ into two polynomials $Z_a(x)$ and $Z_b(x)$ both with degree less than r such that $$Z(x)=\{Z_a(x)X^n+Z_b(x)\} \bmod g(x),$$

where n is an integer less than r; and configuring a table 1 of a size $2\exp(\deg(Z_a(x)))$ for the squaring operation of the term $Z_a(x)$ and a table 2 of a size $2\exp(\deg(Z_b(x)))$ for the squaring operation of the term $Z_b(x)$; and recursively generating $Z(x)$ in r steps by initially setting $Z(x)=x\exp(k_{r-1})$ for the first step and then computing $Z(x)$ for the steps $i=r-2$ to 0 by the expression $$(\text{table } 1[Z_a] + \text{table } 2[Z_b]) \times \exp(k_i),$$

where $Z_a$—coefficient of $Z(x)$ with power higher than $n-1$, $Z_b$=coefficient $Z(x)$ with power lower than n, table $1[y]=y2 \bmod g(x)$, and table $2[y]=(2^n y)^2 \bmod g(x)$, for $y=0$ to $2^n-1$ as the coefficients of a polynomial up to degree $n-1$.

10. The method in accordance with claim 9 including the step of setting the value of $n=r/2$.

* * * * *